June 2, 1970      O. SAHM      3,514,817

TUBULAR ROPE CLIP BLANK

Filed Nov. 22, 1968

United States Patent Office 3,514,817
Patented June 2, 1970

3,514,817
TUBULAR ROPE CLIP BLANK
Otto Sahm, Behringstrasse 8, Bremerhaven, Germany
Filed Nov. 22, 1968, Ser. No. 778,081
Claims priority, application Germany, Nov. 24, 1967,
S 63,155
Int. Cl. F16g 10/02
U.S. Cl. 24—123     2 Claims

ABSTRACT OF THE DISCLOSURE

A rope clip blank of ductile material for making a mechanical rope splice having a conical end portion, by swaging said blank onto the rope strands. The tubular blank has a flat-cylindrical or oval portion the semi-circular walls of which are margined by excentric semi-circles such that the wall thickness of said walls decreases from the straight side walls towards a minimum wall thickness at the apices of said semi-circular walls. The blank further has a tapered end portion of steadily decreasing wall thickness towards the outer end of said end portion.

---

This invention relates to a tubular rope clip blank of ductile material having a flat-cylindrical portion with two straight side walls and two semi-circular walls connecting said side walls, as well as an end portion which tapers from the flat cylindrical cross-section to a smaller circular cross-section with decreasing wall thickness.

Rope clip blanks of this kind serve for connecting two adjacent pieces of rope, particularly when forming a loop at the end of such rope. The rope clip blank that preferably consists of an aluminum alloy is swaged onto the two rope pieces such that the finished rope clamp assumes a cylindrical shape over its main portion where the blank is flat cylindrical, while the end portion of the rope clip opposite the loop becomes conical. The cylindrical portion of the finished clamp embraces two rope pieces or rope strands. There is, however, only one rope strand within the conical end portion, namely the life rope that leaves from the rope clip at its end opposite the rope loop. The conical shape of the end portion reduces the danger that the rope clip catches on a projection or hook with consequent damage in case the rope together with the loop is moved longitudinally.

Various rope clip blanks are known that are preformed in the region of the finally conical rope clip portion. The flat cylindrical portions of all of said blanks have identical wall thickness all around its cross-section. Hence, the semi-circular walls of such blanks are edged by concentric semi-circles. When the flat cylindrical portions of said blanks are swaged into the cylindrical final shape, clip material must necessarily flow from the semi-circular walls into the side wall regions, as the two rope pieces introduced into the flat cylindrical blank portion cannot be compressed to the diameter of a single rope. However, no more than the cross-section area of a single rope strand would be left free within the rope clip, if no material would flow from the semi-circular walls into the regions of the side walls.

On the other hand, considerable forces are required to deplace material from the semi-circular walls, as the flow of material commences only at a certain pressure, and the area perpendicular to the direction of force is very large in the region of the semi-circular walls. Such considerable force must be backed by the rope strands, this in turn leading to a considerable tension jump at the ends of the cylindrical portion of the swaged clamp, i.e. of that rope clip portion which accommodates two rope pieces in side-by-side relationship.

In order to overcome the above-mentioned drawbacks that were encountered in using the known pre-tapered rope clip blanks for making a rope clip with a conical part on one end, it is proposed, according to the invention, that the semi-circular walls of the flat cylindrical portion are margined by excentric semi-circles such that the varying thickness of the semi-circular walls reaches the thickness of the side walls only at the transitions where the walls join each other, and that the thickness of the end portion decreases continuously from the circumferentially varying wall thickness of the flat cylindrical portion to an annular shape.

Thereby, upon swaging the new rope clip blank more space is left to the two rope strands accommodated within the rope clip, and the necessity of deplacing material from the semi-circular walls is disposed of respectively decisively diminished. Correspondingly, the stress imposed upon the rope strands by the rope clip is decreased without impairing the strength of the rope joint.

Since the wall thickness of the pre-formed end portion of the rope clip blank according to the invention gradually changes from the circumferentially varying wall thickness of the flat cylindrical portion to the annular cross-section, without involving any sudden change in wall thickness, any load exerted on the rope is smoothly introduced to and distributed within the rope clip, and dangerous unsteadiness is avoided. Preferably, the transition of the flat cylindrical portion of the rope clip blank into its end portion lies within the same plane.

In order that the present invention may be well understood, there will now be described a preferred embodiment thereof, given by way of example only, with reference to the accompanying drawings in which.

Figure 1:
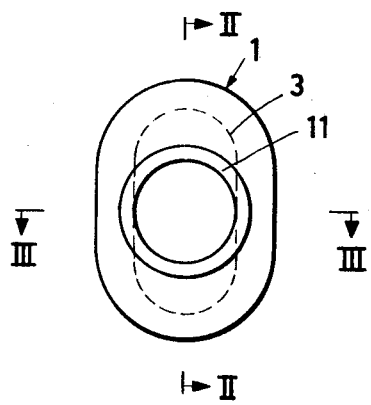
FIG. 1 is an end view of the pre-formed end portion of the rope clip blank according to the invention.
Figure 2:
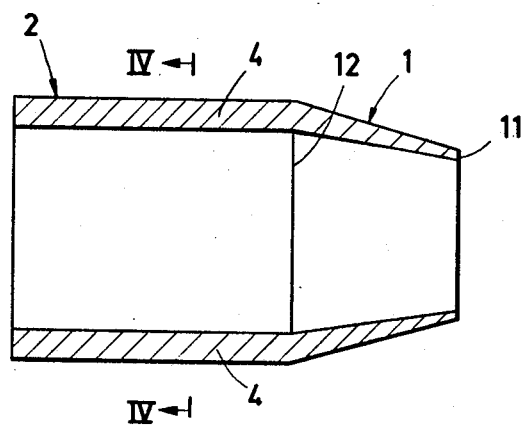
FIG. 2 is a cross-section on a line II—II in FIG. 1.
Figure 3:
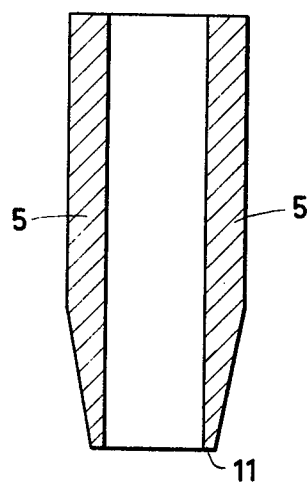
FIG. 3 is a cross-section on a line III—III in FIG. 1.

While the end view of FIG. 1 shows only the pre-tapered end portion 1 of the rope clip blank (the inner profile of the flat cylindrical blank portion 2 being indicated merely by dotted line 3), the cross-sections of FIGS. 2 and 3 show the mutual relationship of the before-mentioned portions of the rope clip blank according to the invention.

The cross-section of FIG. 2 traverses the semi-circular walls 4 where they have their smallest wall section. A comparison with FIG. 3 shows that the wall thickness of the side wall 5 is considerably greater. Only at the transitions 6 (FIG. 4) the semi-circular walls 4 reach the same wall thickness as side walls 5 have.

Figure 4:
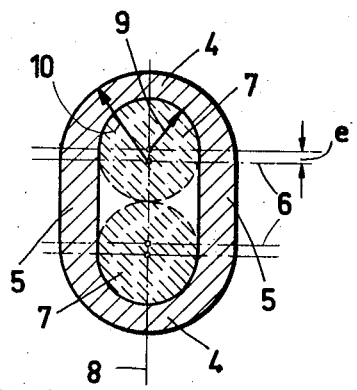
FIG. 4 is a cross-section on a line IV—IV in FIG. 2, after insertion of two rope pieces.

FIG. 4 further evidences how the centers of the semi-circles forming the margins of both the semi-circular walls 4 are mutually offset by the excentricity e, such, that after swaging in the direction of line 8 connecting the middles of rope strands 7 a distance remains within the clip which is by 2e larger than twice the inner radius 9.

Figure 5:
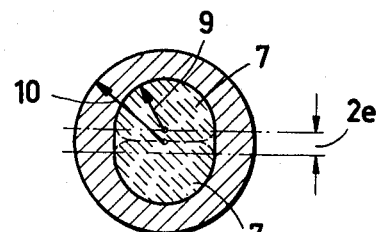
FIG. 5 is a cross-section similar to FIG. 4 after the swaging process has been performed.

FIG. 5 shows that condition, i.e., after the flat cylindrical portion 2 of the rope clip blank has been swaged into a cylindrical shape of a diameter corresponding to twice the outer radius 10 of the semi-circular walls 4.

The wall thickness of the tapered end portion 1 of the rope clip blank decreases continuously—proceeding from the cross-section profile of the flat cylindrical portion 2— to an annular surface 11 at the outer end of portion 1. The transition from portion 2 to portion 1 lies within the plane represented by line 12 in FIG. 2.

What I claim is:

1. A tubular rope clip blank of ductile material having a flat-cylindrical portion with two straight side walls and two semi-circular walls connecting said side walls, as well as an end portion which tapers from the flat-cylindrical cross-section to a smaller circular cross-section with decreasing wall thickness, characterized in that the semi-circular walls of the flat-cylindrical portion are margined by excentric semi-circles such that the varying thickness of the semi-circular walls reaches the thickness of the side walls only at the transitions where the walls join each other, and that the thickness of the end portion decreases continuously from the circumferentially varying wall thickness of the flat-cylindrical portion to an annular shape.

2. Rope clip blank according to claim 1, characterized in that the transition of the flat-cylindrical portion of the rope clip blank into its end portion lies within the same plane.

References Cited

UNITED STATES PATENTS 2,936,499   5/1960   Rohland.

FOREIGN PATENTS 749,597   1/1967   Canada.

BERNARD A. GELAK, Primary Examiner